United States Patent [19]
Sagi et al.

[11] Patent Number: 5,861,546
[45] Date of Patent: Jan. 19, 1999

[54] INTELLIGENT GAS FLOW MEASUREMENT AND LEAK DETECTION APPARATUS

[76] Inventors: Nehemiah Hemi Sagi, 1436 N. Claridge Way, Carmel, Ind. 46032; Guosen Ronald Zhang, 7316 B Manchester Dr., Indianapolis, Ind. 46260; Ranajit Rana Ghosh, 148-5 S. Arnold Dr., West Lafayette, Ind. 47096

[21] Appl. No.: 914,902

[22] Filed: Aug. 20, 1997

[51] Int. Cl.$^6$ .............................. G01M 3/08; G01F 1/37
[52] U.S. Cl. ................... 73/40.5 R; 73/861.52; 73/861.55; 137/599.1
[58] Field of Search .................... 73/861.55, 861.52, 73/202–204.27, 40.5 R; 137/599.1

[56] References Cited

U.S. PATENT DOCUMENTS

| | | | |
|---|---|---|---|
| 4,524,616 | 6/1985 | Drexel et al. | 73/203 |
| 4,841,776 | 6/1989 | Kawacchi et al. | 73/706 |
| 5,044,199 | 9/1991 | Drexel et al. | 73/202 |
| 5,099,881 | 3/1992 | Nakajima | 137/599.1 |
| 5,269,171 | 12/1993 | Boyer | 73/40.5 R |
| 5,305,638 | 4/1994 | Saghatchi et al. | 73/202 |
| 5,398,721 | 3/1995 | Pryor | 137/613 |
| 5,445,035 | 8/1995 | Delajoud | 73/861.52 |
| 5,554,805 | 9/1996 | Bahrton | 73/202 |

*Primary Examiner*—Hezron Williams
*Assistant Examiner*—Jay L. Politzer

[57] ABSTRACT

An intelligent leak test and gas flow measurement apparatus having a body with a conical bore, a center shaft positioned in the conical bore to form a laminar flow gap bounded by the surface of the conical bore and the center shaft, a precisely machined spacer at the second end portion of the body for positioning the center shaft within the conical bore, a pressure differential sensor in contact with the laminar flow gap. A temperature sensor for determining the temperature of the gas flowing through the laminar flow gap is located on a columnar housing and a static pressure sensor for measuring the static pressure is located within the columnar housing. A microcontroller connected to the pressure differential sensor, the temperature sensor and the static pressure sensor, which microcontroller uses embedded software to calculate gas flow measurements and leak detection. An inlet end cap is attached to the first end portion of the body and an outlet end cap is attached to the second end portion of the body to enclose the center bore of the body and the center shaft.

13 Claims, 6 Drawing Sheets

INTELLIGENT GAS FLOW MEASUREMENT AND LEAK DETECTION APPARATUS

FIELD OF THE INVENTION

The present invention relates generally to the design of an apparatus designed to obtain precision flow measurements for low and medium gas flow rates and provides accurate leak detection capabilities.

BACKGROUND OF INVENTION

While there are other gas flow sensors in the prior art, the present invention incorporates improvements that result in more accurate leak detection and flow measurement capabilities in a simple, easily used configuration.

One example of prior art is disclosed in U.S. Pat. No. 4,800,754 naming David M. Korpi as the inventor and Sierra Instruments, Inc. as the assignee. In the aforementioned patent, a widerange, adjustable flowmeter is disclosed. This design utilizes an adjustable laminar flow element located within a bore for fine adjustments and an adjustable, restriction secondary passage for crude adjustments. In this design, all or a selected portion of the flows to be measured can be diverted through the secondary passage. The physics of this design is based on heat transfer which is less accurate and slower to react than the technology of the present invention. Finally, by design, this apparatus is limited to low flow pressure measurements. This apparatus unnecessarily complicates the flow measurement process for various flow ranges.

Another example of prior art is disclosed in U.S. Pat. No. 4,487,062 naming John G. Olin and David M. Korpi as inventors and Sierra Instruments, Inc. as assignee. In the aforementioned patent, a mass flowmeter is disclosed. This flowmeter also includes a primary and secondary passage in addition to a pair of resistance wire coils surrounding the sensor tube whereby resistance is proportional to the fluid flow rate. Again this type of flowmeter is unnecessarily complicated.

Another example of the prior art is disclosed in U.S. Pat. No. 5,099,881 naming Takeshi Nakajima as inventor. In the aforementioned patent, the flow dividing structure of the mass flow controller includes a main mass flow passage and a bypass flow passage. Due to the conical bore design of the flow dividing structure, the cross-sectional area of the main passage cross-sectional area can be adjusted and the ratio of the areas between the main passage and bypass passage will determine the proportion of the flow passing through the bypass passage, where the measuring sensor is located. Consequently, the conical bore acts as a flow divider and not a flow sensor as in the present invention.

Another example of the prior art is disclosed in U.S. Pat. No. 5,305,638 naming Hamid Saghatchi et al as inventors. The conical portion in this invention serves a similar function as the conical portion in the Nakajima patent. As before, the conical portion is used as a flow divider rather than a flow sensor as in the present invention.

Another example of a prior gas flow measurement device is disclosed in U.S. Pat. No. 5,445,035 naming Pierre R. Delajoud as the inventor. In the aforementioned U.S. Patent, a gas flow measurement apparatus is disclosed with an elongated cylindrical piston positioned concentrically within a bore is used thus forming an annular flow channel of uniform depth. Ferrules are located at each end to position the piston. While this invention is an improvement over previous gas flow sensors, there are still disadvantages. The primary disadvantage is the two adjustments that must be made to position the piston. The device also uses a cylindrical piston which does not allow the same degree of control over the acceleration of the flow. Yet another disadvantage locates the pressure measurement port where flow is not yet filly developed, which has a tendency to adversely affect the accuracy of the measurement. Finally, this design uses two pressure sensors, one pressure sensor and one pressure differential sensor.

The main disadvantages of the prior art gas flow measurement apparatus are as follows:

1) To achieve as large a differential pressure as possible, the pressure measurement device is located where the flow is not fully developed, and hence, turbulence can occur and larger uncertainty will result in the measurement.

To avoid the turbulence flow phenomenon on measurement, the present invention measures the differential pressure on the section of laminar flow gap where the laminar flow is fully developed, rather than two extreme ends of the flow.

2) The prior art cannot adjust the flow rate to the desired differential pressure and maintain the desired accuracy. This is critical for in-line flow measurements when small differential pressure is required in order not to affect the flow, e.g. leak flow measurement when the unit under test is maintained at low pressure. To increase the differential pressure resolution, acceleration/deceleration of the flow is employed in the present invention. The acceleration/deceleration is achieved by creating different cross sectional area of the gas flow at the two receiving ports of the differential pressure sensor. The cross-sectional area of the gap is the area between the ends of the bore and the shaft and is represented by the following formula:

$$A = \pi \cdot (R+h)^2 - \pi \cdot R^2 = h \cdot (2 \cdot R + h) \approx 2\pi h R$$

where

A: Cross-sectional area of the gap

R: The radius of the shaft at particular location h: The gap at the particular location It is obvious that the cross sectional area will be larger if R and h are increased and vice visa. The following formula is based on the mass conservation law:

$$d \cdot v_1 \cdot A_1 = \text{MassFlow}$$

where d: density of the gas $v_1$: average flow velocity at the receiving port $A_1$: cross sectional area at the receiving port Due to the fact that the cross sectional area at the two ports is different, the velocity at the receiving port is inversely proportional to the cross sectional area if all the other parameters are kept constant.

Based on the energy conservation law, $$E = \frac{P}{S} + \frac{1}{2} \cdot v^2 = \text{Const.}$$

Assuming there is no significant density and temperature change along the section of the passage, the increase of the velocity of the flow will result in a decrease in the static pressure and the amount of the pressure drop is determined by the amount of the velocity change between the two ports.

Now the differential pressure is composed of two parts. The first part comes from the works by friction and shear force as Hougan Poissile Phenomena. The second part is contributed by the different velocities at the two receiving ports. As a result, the differential pressure can be controlled and is more repeatable. The gas velocity can be increased or decreased by controlling the flow direction across the conical section.

Furthermore, precisely machined spacers at the second end portion of the body can linearly position the shaft within the core to control how much the differential pressure is "Amplified".

Because the different cross sectional areas at both receiving ends is critical to this application, the machining and surface finish of the shaft and bore become more important than that in the application on a flow divider due to the ratio of the area between the main passage and bypass passage.

Besides, the prior art requires remote electronics, such as PC and data acquisition systems to interpret the signals, compute the flow and perform the control function if needed. These require higher skill from the user, and complicate the application. The present invention provides an integrated solution in a compact form. Furthermore, laminar sensors in the prior art are more difficult to clean and maintain than those in the present invention.

In summary, the present invention represents an improvement over the prior art due to the more simplistic design of the apparatus, the ease of adjustability and repeatability, the ability to accelerate/decelerate flow to create improved mathematical correlations and the lower anticipated costs of manufacturing the apparatus.

SUMMARY OF THE INVENTION

The primary object of the present invention is to provide a gas leak sensor and measurement device that offers greater speed and accuracy than currently existing art.

Another object of the present invention is to provide a gas leak sensor and measurement device that offers improved data logging and analysis capabilities over the currently existing art.

Another object of the present invention is to provide a gas leak sensor and calibration measurement device that offers a more precise measurement at low flow rates than other sensors in the currently existing prior art.

Yet another object of the present invention is to provide an apparatus that can act as an intelligent gas leak sensor (IGLS) and as an intelligent gas flow standard (IGFS) for flow measurements with no difference in design and only minor differences in finish quality of certain components and calibration of the apparatus.

Yet another object of the present invention is to provide a handheld unit that can be used for a wide range of gas flow allowing it to be easily used in a variety of applications.

Finally, another object of the present invention is to provide an apparatus that can be easily adjusted using calibration equipment.

These objects are accomplished by the present invention, an intelligent leak test and gas flow measurement apparatus having a body with a conical bore, providing acceleration/deceleration of the flow passing through it and establishing controlled differential pressure and higher resolution than otherwise a center shaft positioned in the conical bore to form a laminar flow gap bounded by the surface of the conical bore and the center shaft the laminar flow gap having a width that ensures a Reynold number of less than 700 a precisely machined spacer at the second end portion of the body for positioning the center shaft within the conical bore, a pressure differential sensor in contact with the laminar flow gap. To avoid any undesirable turbulence where the differential pressure is measured, this invention selects two receiving ports sufficiently within the laminar flow gap such that the laminar flow is fully developed and little or no turbulence exists between the two ports. Both a temperature sensor and a static pressure sensor for measuring the temperature and static pressure of the gas flowing through the laminar flow gap is located within a columnar housing very close to the gas flow to realistically reflect the characteristics of the flow. A microcontroller connected to the pressure differential sensor, the temperature sensor and the static pressure sensor, which microcontroller uses embedded software to calculate gas flow measurements and leak detection. An inlet end cap is attached to the first end portion of the body and an outlet end cap is attached to the second end portion of the body to enclose the center bore of the body and the center shaft. The IGFS/IGLS system can be installed as either a permanent or a portable configuration depending on the application requirements. This invention can be used for precision flow measurement and calibration (IGFS) or leak flow detection (IGLS).

This invention works as a leak detecting unit as it measures the amount of make-up mass flow to the unit under test which is assumed to be at steady state conditions. Therefore, the amount of mass flow to the unit under test equals the flow leakage.

Inlet pressure expansion tank 115 is used to reduce pressure fluctuations. There is no need for large tanks, however, an expansion tank 115 between the pressure/vacuums controller 114 and IGLS will reduce pressure fluctuations and significantly increase system performance.

A filter 116 shall be installed on the inlet side of the IGLS/IGFS to avoid excessive contamination, which may cause the distortion of the readings.

Pressure valve 10 can be three-way valve connected to the unit under test when energized and connected to atmosphere when it is deenergized. Fill valve 112 is used to bypass the IGFS/IGLS passage, and to quickly fill up the unit under test to get to a steady state condition.

Two types of pressure/vacuum controllers 114 can be used; a manual type (with knob adjustments) and an electronic pressure controller. The electronic pressure controller should be compatible with the electrical output signal. For higher flow rates, an electronic pressure controller with a volume booster may be required. All pressure controllers must include a vent to allow pressure reduction. When selecting a pressure controller, the most important criteria are pressure stability and response time.

The IGLS can control a fill valve 112, pressure valve 110 as well as an electronic pressure/vacuum controller 114, if available.

When installation of the system is completed, push the start button on the front panel or the remote input of the IGLS will start the leak test. The software inside of the IGLS will do all valve open/close for the predetermined period of time. At the end of the test, the IGLS will display the test pass/fail result. If "Fail" is detected, the type of failure such as "GrossLeak" (pressure could not be established due to extremely large leak), "FineLeak" (the leakage value is out of the predetermined tolerance), "BackFlow" (the direction of flow is opposite to what is supposed to be" etc. will be displayed on the LCD screen. Pressure valve 110 can be three-way valve connected to the unit under test when energized and connected to atmosphere when it is deenergized. Fill valve 112 is used to bypass the IGFS/IGLS passage, and to quickly fill up the unit under test to get to a steady state condition.

BRIEF DESCRIPTION OF DRAWINGS

In order that the invention can be more clearly ascertained, examples of preferred embodiments will now be described with reference to the accompanying drawings.

DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
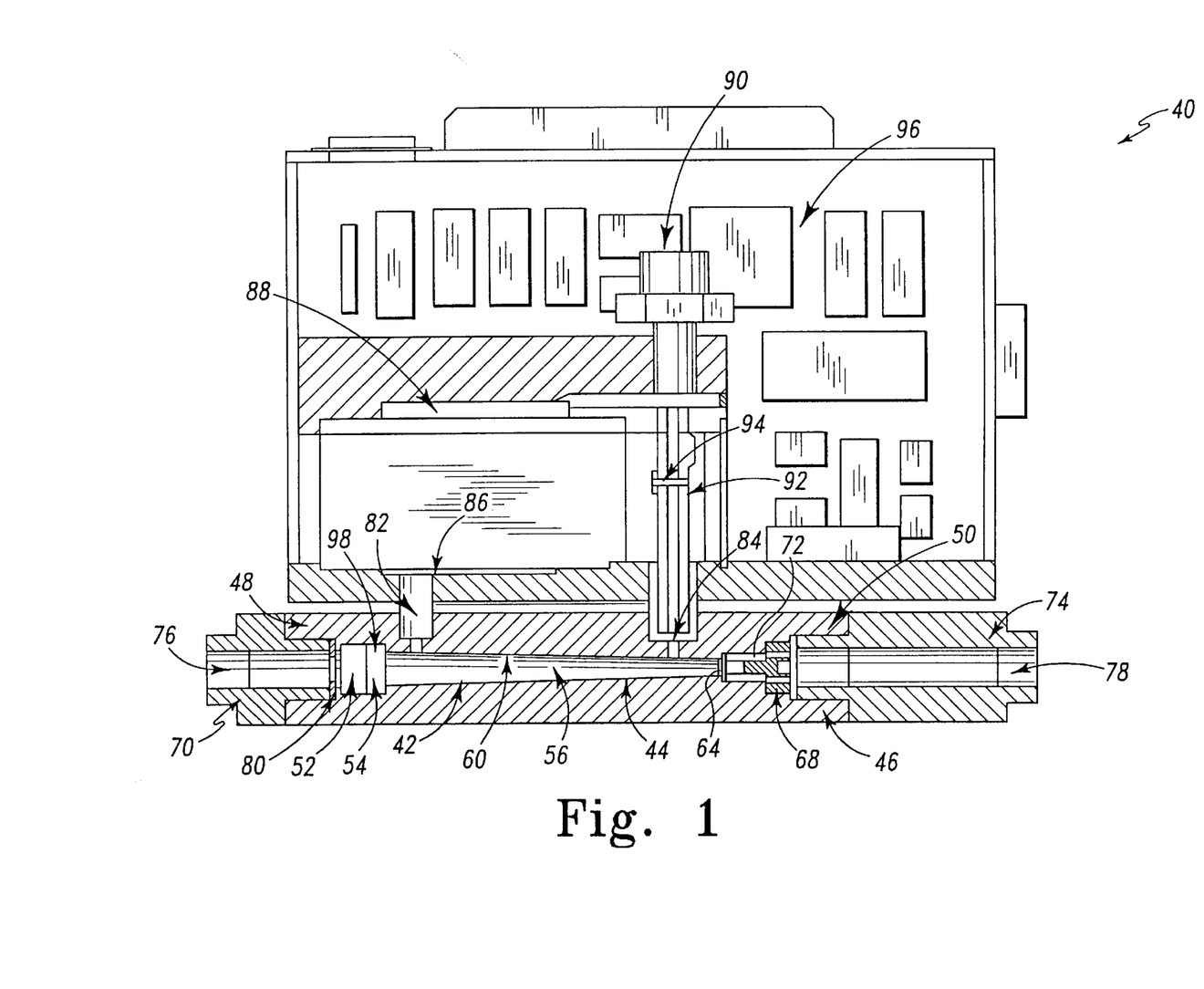
FIG. 1 is a section diagram of an intelligent gas leak sensor and gas flow standout.
Figure 6:
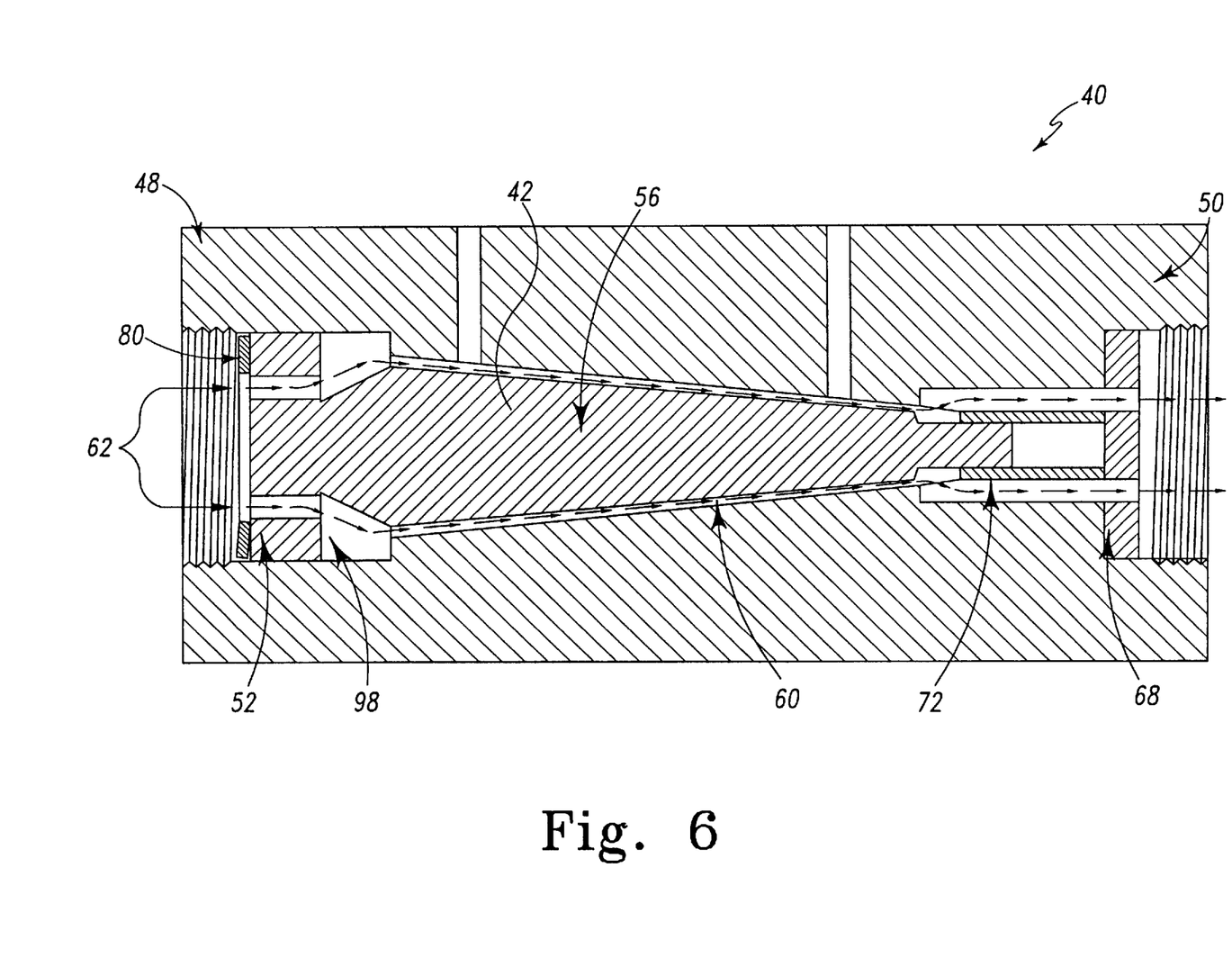
FIG. 6 is a section view of the flow pattern of the device in the leak test mode.
Figure 7:
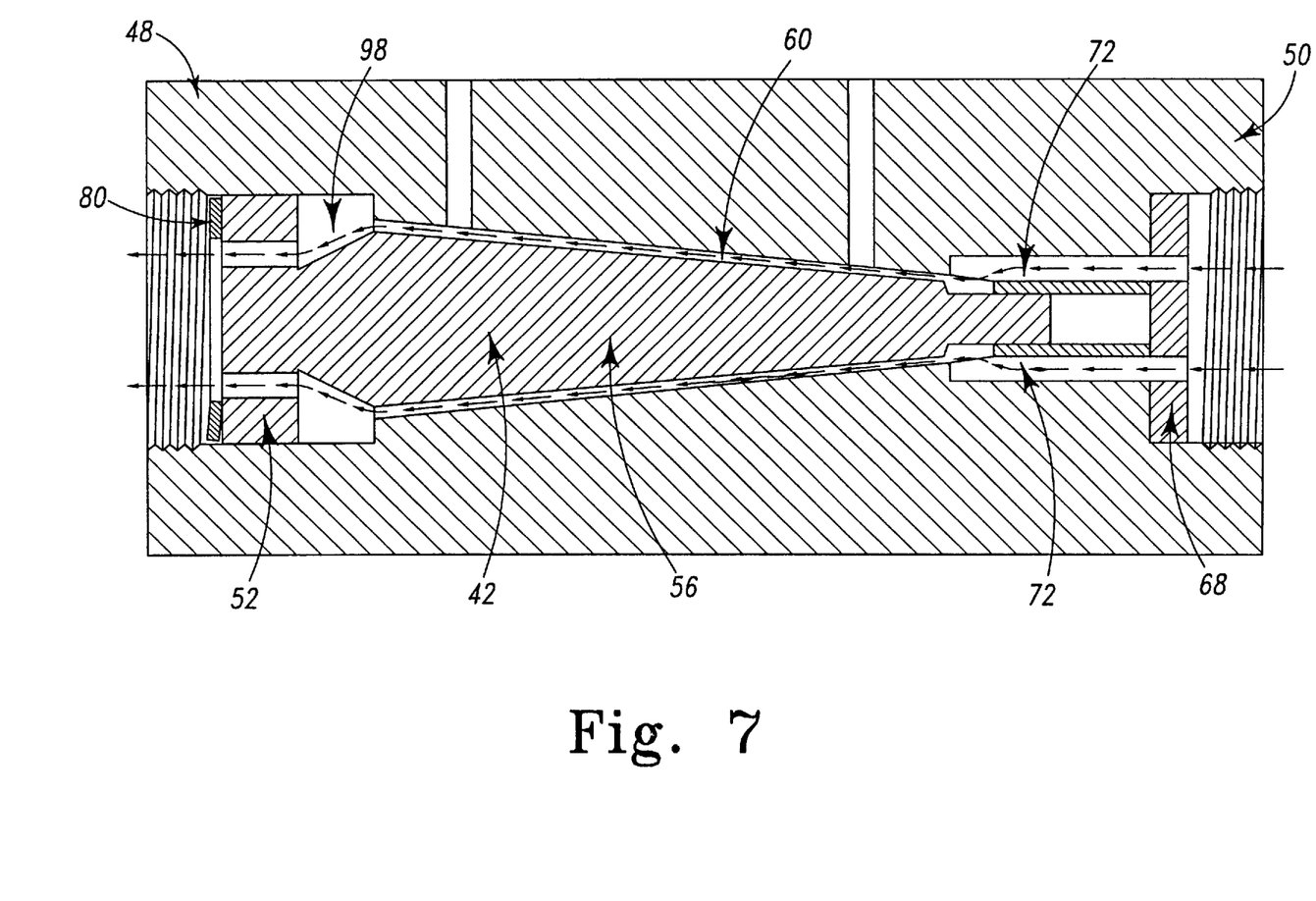
FIG. 7 is a section diagram of the flow pattern of the device in the gas flow measurement mode.

Referring now to FIG. 1, a sectional diagram of an intelligent gas leak sensor or IGLS and an intelligent gas flow standout 40 (IGFS) is shown. While the IGLS and the IGFS differ in function, the design is the same except finish quality of the center shaft 42 and bore 44 are higher quality in the IGLS 40 unit to improve measurement accuracy for leak tests. Also, the calibration for the units differ. The gas flows from left to right in the IGLS 40 and from right to left in the IGFS as is illustrated in FIGS. 6 and 7 discussed subsequently. This illustration depicts the IGLS and IGFS which includes a body 46 made of 304 or 304L stainless steel or other similar material for improved tolerance characteristics, machining capabilities, temperature stability and increased tolerance to various gases. The body 46 has a first end portion 48 and a second end portion 50. The external profile of the body 46 is cylindrical and varies in size in correlation to the flow rate of the gas. A conically shaped center shaft 42 is inserted into a precisely machined conical bore 44 within the body 46. The center shaft 42 comprises a cylindrical portion 52, a chamfer 54, and a conical portion 56. Pressure is transferred through second receiving port 84 to columnar housing to a second pressure housing 88.

Figure 2:
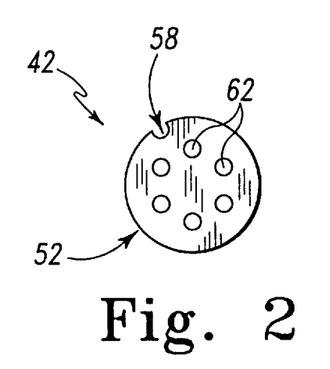
FIG. 2 is an end view of the cylindrical portion of the center shaft.

The cylindrical portion 52, better illustrated in FIG. 2, also contains a first machined bore 58 for receipt of a dowel pin (not shown) which allows the dowel pin to be press fit into the first machined bore 58. The body 46 contains a second machined bore (not shown) which allows the dowel pin to pass through the second machined bore forming a keyway such that the center shaft 42 can be removed and cleaned without the need for recalibration, i.e. the center shaft 42 can be inserted into its original position in terms of orientation.

Preferably the conical portion 56 of the center shaft 42 shall have a total angle between 10 degrees and 1 degree with an optimum angle of 2 to 6 degrees. The location of the center shaft 42 within the bore 44 in part located by the use of a spring washer (not shown) will form a laminar flow gap 60 between the inner portion of the bore 44 and the conical portion 56 of the center shaft 42. This gap 60 will be uniform along the length of the conical portion 56 of the center shaft 42 such that a laminar flow will result. The gap 60 will have a width that provides a Reynold number of less than 700. Laminar flow is uniform and provides more accurate pressure measurements and flow calculations. With the conical shape and the ability to adjust the center shaft 42 for calibration, the flow can be accelerated or decelerated to obtain a polynomial relationship for leak test or flow measurement purposes. The measurement taken is amplified by the use of typical amplifiers on the market to improve the accuracy of the readings. This ability to accelerate flow is important in relation to the mathematical equations discussed below.

The center shaft 42 has an inlet end or cylindrical portion 52 precisely located in bore 44 to support the conical portion 56 of the center shaft 42 such that the center shaft 42 is supported on both ends with a plurality of inlet holes 62 with the preferred embodiment containing 6 inlet holes 62. The outlet end 64 of the center shaft 42 is reduced to allow flow to enter outlet ports 72 drilled into the second end portion 50 of the body 46. The 6 outlet ports 72 in the preferred embodiment are aligned with 6 holes in a spacer 68 to allow the gas to flow through an outlet end cap 74. The body 46 has the same number of outlet ports 72 drilled in the second end portion 50 of the body 46 to direct the gas flow from the center shaft 42 to the spacer 68.

A first and second end cap 70 and 74, respectively, are attached to the first and second end portions 48 and 50, respectively, of the body 46, respectively, to enclose the conical bore 44 and center shaft 42 within the body 46. The first end cap 70 is the inlet cap in the leak test mode and the second end cap 74 is the outlet cap in the leak test mode. The inlet and outlet end caps 70 and 74, respectively, are attached to the body 46 using typical fasteners available on the market, such as screws rotated into threaded holes in the body 46. The center of the first and second end caps 70 and 74, respectively, contain a first and second bore, respectively 76 and 78, respectively, to allow the gas to flow through each of the first and second end caps, 70 and 74, respectively.

The center shaft 42 is adjusted within the bore using the spacer 68 machined to a precise dimension such that the spacer 68 located at the outlet end 64 of the center shaft 42 and the spring washer 80 located at the inlet end 52 of the center shaft 42 position the center shaft 42 and hold it in place in a calibrated position. This design provides a unit where the calibration remains constant and can only be modified with a spacer 68 of a different dimension.

The center shaft 42 can also be calibrated using an adjusting screw or calibrated locating cylinder at the second end portion 50 of the body 46 or the narrow end of the conical portion 56 of the center shaft 42. The spacer 68 is threaded and the adjusting screw can be adjusted by rotating the adjusting screw clockwise or counterclockwise to position the center shaft 42 according to calibration measurements. The adjusting screw and a spring washer 80 located at the inlet end 52 of the center shaft 42 apply the appropriate forces to locate the center shaft 42 and hold it in place to provide for a uniform but adjustable gap 60 between the conical portion 56 of the center shaft 42 and the surface of the conical bore 44 within the body 46.

A first receiving port 82 and a second receiving port 84 are drilled in the body 46 to monitor the pressure differences in the laminar flow around the conical center shaft 42. The first receiving 82 port is drilled into the top side of the body 46 and extends from the top side of the body 46 to the conical bore 44 within the body 46. The first receiving port 82 can be located anywhere along the conical bore 44 where L/h>50. In this equation, the length from the edge of the conical portion 56 of the center shaft 42 to the location of the first receiving port 82 is "L" and the height between the outer wall of the conical portion 56 of the center shaft 42 and the inner wall of the machined bore 58 is "h" or the height of the laminar flow gas.

The second receiving port 84 is also drilled in the top side of the body 46 and is located downstream of the first receiving port 82 or toward the smaller end of the conical center shaft 42. The second receiving port 84 also extends from the top side of the body 46 to the conical bore 44. The second receiving port 84 can be located at a second position anywhere between the first receiving port 82 and the outlet end 64 of the center shaft 42 but it is preferable for the first and second receiving ports, 82 and 84, respectively, to be separated by a distance sufficient to maintain a constant differential pressure per inch of flow length which is usually 2 to 3 inches.

The positions of the first receiving port 82 and the second receiving port 84 are designed to be located sufficiently within the laminar flow gap 60 such that the laminar flow of the gas is fully developed and little or no turbulence in the gas flow exists.

Gas enters the first receiving port 82 and flows to a first pressure chamber or first diaphragm 86 with a movable outer wall. Gas also enters the second receiving port 84 and flows through the columnar housing to a second pressure chamber or second diaphragm 88 also with a movable outer wall. The force that the first pressure chamber 86 exerts against the second pressure chamber 88 measures the relative displacement of the first and second diaphragms, 86 and 88 respectively, and a value for the differential pressure can be determined. The first and second diaphragms, 86 and 88, respectively, are located off center from the body 46 and center shaft 42 to minimize volumetric changes and increase response time. The first receiving port 82, the second receiving port 84, the first diaphragm 86 and the second diaphragm 88 all form the first pressure sensor or pressure differential sensor that measures differential pressure. This type of differential pressure measurement is termed capacitance technology and is commonly known in the industry.

The second pressure sensor or static pressure sensor 90 is located within the columnar housing 92. A static pressure sensor 90 is located on the top of the columnar housing 92 to measure static pressure within the laminar flow gap 90. The static pressure sensor 90 is exposed to the same gas flow as that of the second diaphragm 88.

A temperature sensor 94 is located on the side of the columnar housing 92 to measure the temperature within the columnar housing 92. The temperature sensor 94 is attached to a portion of the columnar housing 92 which has been machined to a point in which the air temperature within the columnar housing 92 is the same as that of the thin, machined columnar housing 92 wall. The temperature sensor 94 is a typical RTD type sensor commonly used in the industry. The columnar housing 92 has tolerance expansion capabilities by positioning an o-ring at each end of the columnar housing 92. The o-rings seal the columnar housing 92 for accurate measurement but also allow the columnar housing 92 to expand or contract to allow for temperature differences and dimensional tolerances.

A microcontroller card 96 is connected to the sensors to record all the measurements, provide mathematical correlation polynomial equations, perform temperature and pressure compensation, display readings on an LCD display including pressure, flow and other messages, control the valve sequence for leak test purposes using digital I/O signals, communicate to a personal computer for setup and data acquisition, provide pressure/flow control and send analog signals to remote devices, such as personal computers. The microcontroller can take such measurements and perform such calculations for gas flowing in either direction within the body, such as is illustrated in FIGS. 6 and 7. Further, the microcontroller can measure acceleration and deceleration for sensitivity and repeatability of the calculations.

The microcontroller card 96, the pressure differential sensor and the static pressure sensor 90 are located within a housing or enclosure to protect the components from damage and to make the entire piece of equipment more attractive. On the outside of the enclosure an LCD display is mounted to display various messages to inform the user of measurement results and other messages. Also located on the outside of the enclosure is a start/stop button to start or stop a particular test.

The conical portion 56 of the center shaft 42 is important in the leak test mode. The conical shape allows adjustment of the maximum flow rate for providing for flow adjustment for the same body design and by providing for control at low flow rates due to cone matching. Cone matching allows for better accuracy than cylindrical shapes due to accuracy effects caused by imperfections on the cylindrical surface and consequently, the flow rate can be adjusted to a point just above the value desired and more accurate leak detection is attained. This design just described can accommodate pressures up to 1000 psi and differential pressures from 2 inches water to 135 inches water.

Referring now to FIG. 2, an end view of the center shaft 42 is shown which illustrates the plurality of inlet holes 62 in the inlet end 52 of the center shaft 42 and the first machined bore 58 for receipt of a dowel pin. The inlet holes 62 allow the gas to flow through the cylindrical portion 52 of the center shaft 42 and direct the flow around the conical portion 56 of the center shaft 42 as further illustrated below.

Figure 3:
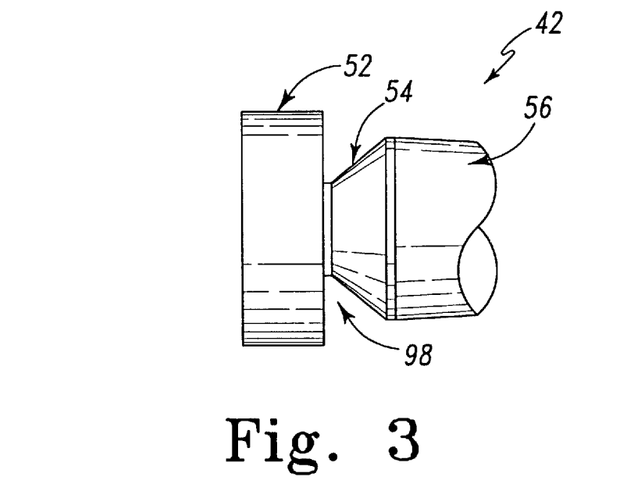
FIG. 3 is an detail view of the cylindrical portion and chamfer of the center shaft.

Referring now to FIG. 3, a detail of the inlet end 52 of the center shaft 42 is shown. The 6 inlet holes 62 are drilled through a round cylindrical portion 52 of the center shaft 42, shown in FIG. 2, such that an opening or equalization chamber 98 is created due to the chamfer 54 of the center shaft 42 immediately after the cylindrical portion 52 of the center shaft 42 which allows the gas to flow in an orderly fashion to the laminar flow gap 60 created by the center shaft 42 and the conical bore 44. The gas flow enters the inlet holes 62 in the cylindrical portion 52 and after striking a chamfer 54, the gas flow is directed toward the conical portion 56 of the center shaft 42. The gas then flows along the conical portion 56 within the laminar flow gap 60 created by the conical bore 44 and the outer surface of the conical portion 56 of the center shaft 42.

Figure 4:
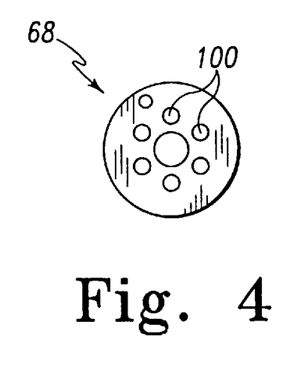
FIG. 4 is an end view of the spacer.

Referring now to FIG. 4, an end view of the spacer 68 is shown which illustrates the plurality of spacer outlet holes 100. The spacer outlet holes 100 align with the 6 outlet ports 72 drilled in the second end portion 50 of the body 46 which allows the gas to pass through to the end cap 74. The spacer 68 contains a pin 101 on its outer periphery for insertion within a hole in the body 46 to allow for precise repeatability when the components are removed and then reassembled for maintenance cleaning.

Figure 5:
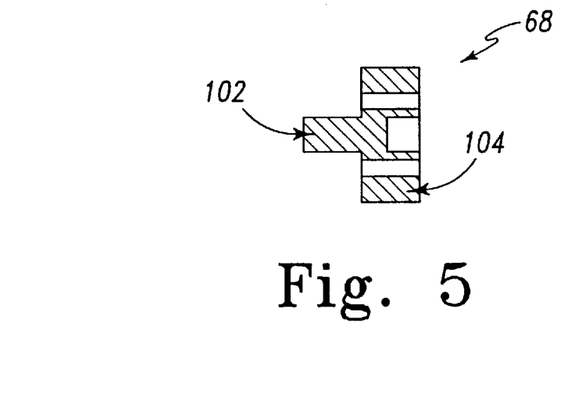
FIG. 5 is a side view of the spacer.

Referring now to FIG. 5, a side view of the spacer 68 is shown which illustrates the positioning structure of the spacer. A small cylindrical portion 102 protrudes from the larger cylindrical portion 104 which comes into contact with the outlet end 64 of the center shaft 42 to hold the center shaft 42 in place.

Referring now to FIG. 6, a section view is shown which illustrates the flow pattern of the device in the leak test mode. The flow enters the first end portion 48 of the body 46 or the end in which the center shaft 42 is larger. The gas flows through the plurality of inlet holes 62 in the inlet end 52 of the center shaft 42, which in this instance is 6 holes and enters an equalization chamber 98 formed by the external shape of the center shaft 42 and the internal bore of the center bore 44. The gas then flows up one side of the equalization chamber 98 and enters the laminar flow gap 60 between the outer portion of the center shaft 42 and the inner portion of the center bore 44. The laminar flow gap 60 is uniform for the length of the conical portion 56 of the center shaft 42 until the gas reaches the outlet ports 72 for the device. The gas flows through the 6 outlet ports 72 drilled in the body 46 and through 6 holes in the spacer 68. From there the gas flows through the outlet end cap (not shown).

Referring now to FIG. 7, a section view is shown which illustrates the flow pattern of the device in the gas flow measurement mode. Up to this point the description has centered around the leak test mode of the apparatus. In the leak test mode, the gas flow enters the first end portion 48 of the body 46 and exits the second end portion 50 of the body 46. When the apparatus is used as a flow measurement device, the gas flow is reversed, i.e. the gas enters the second end portion 50 of the body 46 and exits the first end portion 48 of the body 46. The flow is reversed for gas flow measurement because the taper on the conical portion 56 of the center shaft 42 increases in the gas measurement mode and the conical center shaft 42 acts as a diffuser. The increasing angle linearizes the flow rate. As the gas expands, the static pressure increases, the velocity reduces and the differential pressure becomes smaller. This arrangement provides for minimal pressure losses and the capability to measure higher flow rates. Furthermore, the more linear the flow the more precise the measurement. It is important to note that the apparatus described is very useful for precision flow measurements at low flow rates. By adjusting the gap and tapers for the conical portion 56 of the center shaft 42, precision measurements for medium flow can also be taken.

Having set forth the structure of the apparatus, the equations and computations used to calculate flow and leak detection will now be reviewed.

The basic mathematical model of PID in a continuous system is common and can be expressed as:

$$e(t) = G_d - G(t)$$

where
    e(t)=error
    $G_d$=desired flow or pressure setpoint
    G(t)=measurement of the actual value (static pressure control) or polynomial fit (for flow control)

Then output correction for the PID controller is:

$$x(t) = K_p e(t) + K_i \int_0^T e(t) + K_d \frac{de(t)}{dt} \bigg|_{t=T}$$

where
    $K_p$=proportional coefficient
    $K_i$=integral coefficient
    $K_d$=differential coefficient
    x(t)=output correction In a discrete system, the equation can be converted into $$X(z) = \left[ K_{pd} + \frac{K_{id}}{1-z^{-1}} + K_{dd}(1-z^{-1}) \right] E(z)$$

where
    $K_{pd} = (K_p - T)/2$
    $K_{id} = K_i/T$
    $K_{dd} = K_d/T$
    T=sampling rate The flow calculation algorithms are segmented into viscosity calculation, density calculation, volumetric flow calculation, mass flow, and temperature compensation. The equations for viscosity calculation and density calculation are common. The equations for volumetric flow calculation, the x value and mass flow are modifications of equations contained in a published paper. The Proceeding of the Second International Symposium On Flow on Mar. 23–26, 1981 in St. Louis, Mo. sponsored by Instrument Society of America ISA) and authored by David A Todd. The unique combination of the use of these equations enables the software to use a universal calibration curve that is embedded in microprocessor. Consequently, the Gas Constant (R) and the viscosity data is downloaded from the software program for a particular gas and the need to recalibrate the sensor is eliminated.

The equation for temperature compensation is unique and was developed to allow for thermal expansion. The temperature compensation is performed for high accuracy flow measurement for calibration. It is important to note that the flow components which come into contact with the gas flow must be of the same material so that each of the components will demonstrate equal temperature effects.

The viscosity calculation represented by the following equation:

$$\mu = \mu_0 (1 + C(T - T_0))$$

The Proceeding of the Second International Symposium On Flow on Mar. 23–26, 1981 in St. Louis, Mo. sponsored by Instrument Society of America ISA) and authored by David A Todd is
where
    $\mu_0$=viscosity Temperature $T_o$
    $T_o$=Calibration temperature
    C=Constant slope for one particular gas type
    T=Temperature in application The density calculation is represented by the following calculation:

$$D = \frac{P_S}{R*T}$$

The Proceeding of the Second International Symposium On Flow on Mar. 23–26, 1981 in St. Louis, Mo. sponsored by Instrument Society of America ISA) and authored by David A Todd.

where

D=Density of the gas

R=Constant of the gas

T=Temperature of the gas (absolute)—measured by RTD Sensor (°C.)

$P_s$=Press. (absolute)—measured by press Sensor (PSIA)

The x Value used in the flow calculations is calculated by the following calculation:

$$x = \frac{D*dP}{\mu^2}$$

The Proceeding of the Second International Symposium On Flow on Mar. 23–26, 1981 in St. Louis, Mo. sponsored by Instrument Society of America ISA) and authored by David A Todd.

where dP=Measured Differential Pressure in A/D counts.

The volumetric flow calculation is based on the polynomial coefficient and the differential pressure measurement as follows:

$$Q = (C_0 + C_1 x + C_2 x^2 + C_3 x^3) * \mu/D$$

The Proceeding of the Second International Symposium On Flow on Mar. 23–26, 1981 in St. Louis, Mo. sponsored by Instrument Society of America ISA) and authored by David A Todd.

The mass flow calculation is based on the following formula:

$$dM/dt = (C_0 + C_1 x + C_2 x^2 + C_3 x^3) * \mu$$

Coefficients $C_0$, $C_1$, $C_2$ and $C_3$ have been found different from temperature to temperature due to the thermal expansion of the center shaft. Based on the calibration in the desired temperature range, K was developed to reflect the changes. K is dependent on the thermal coefficient a of the material used. Thus the equation for temperature compensation is as follows:

$$Q = K \cdot (C_o + C_1 x + C_2 x^2 + C_3 x^3) * \mu D$$

$$dM/dt = K \cdot (C_0 + C_1 x + C_2 x^2 + C_3 x^3) * \mu$$

$$K = 1 + *\alpha_1 \cdot (T - T_o) + \alpha_2 (T - T_o)^2$$

The apparatus uses a computer software embedded in the microcontroller to allow the user to easily adjust the function parameters and incorporate the mathematical equations discussed above. The embedded software is the same for the leak test mode and the gas flow measurement mode. It is designed to use "flags" for the different applications. The description of the software screens below and the flow chart in FIG. 8 will demonstrate the process used by the software to determine different applications.

The initial main screen allows the user to enter test parameters (setup screen), configure the software and the test unit or calibrate the test unit (calibration and configuration screens), load and analyze previous test data files (SPC screen) or exit the software program (exit screen).

The setup screen allows a user to perform a variety of tasks and allows access to a run screen and a part data screen. The setup screen allows a user to perform the functions listed below:

choose a sensor for a test choose from a predefined list of units for temperature, pressure, time base, and flow units enter test parameters such as part number, part name or description, and test fill delay time enter parameters pertaining to gas parameters as used in a test add, delete or load part data from a database file set a pressure at which to perform the test. High and low pressure limits can be set which will trigger a fault when the system reaches these limits.

run a leak test via the run screen save setup screen parameters to a datafile download setup screen parameters to a sensor in the test unit upload setup parameters from a sensor in the test unit exit setup screen to main screen print current setup information.

The run screen can be accessed from the setup screen to allow a user to choose a sensor for a test, save test data to a file for statistical process control (SPC) analysis, automatically save test data into a data file for SPC analysis upon each test conducted or exit back to the setup screen.

The part data screen can also be accessed from the setup screen to allow the user to choose part setup data from a data file, add a new part number and description to the part data file, delete an obsolete part from the data file or exit back to the setup screen.

The configuration screen can be accessed from the main screen and allows a user to choose a sensor for a test, to set the maximum for pressure or flow measurements for full-scale voltage level, to enter PID parameters, to choose the COMM port used by the computer to communicate with the test unit, to provide the coefficients needed by the controller to perform the appropriate flow calculations, to enable remote clamping, to enable automatic fill, to enable automatic pressurizing, to set the buffer size for a particular set of test data, to save configuration data parameters to a data file, to download configuration parameters to a sensor in the test as well as a data file, to upload configuration parameters from a sensor in the test until or to exit back to the main screen. The configuration screen also allows the user to access the calibration screen. There are three calibration choices in the configuration screen: temperature, flow rate and static pressure. Either of these "buttons" can be chosen in the configuration screen and each will allow the user to access the calibration screen. The "button" chosen in the configuration screen will determine which sensor will be calibrated in the calibration screen.

The user in the configuration screen will also be allowed to select the operating mode of the test unit. The four test modes are the leak automatic test mode which sets the test in an automatic PID mode, the leak manual test mode which sets the test in a manual mode without PID control, the flow control mode which set the unit in a flow measurement mode and the measurement mode which sets the unit in a free running mode in which data can be observed in the run screen.

The calibration screen can be accessed as discussed earlier from the configuration screen. The calibration screen allows the user to enter a standard in the third column of the calibration parameters table to determine a percent error during the calibration process, to examine the offset and slope for the collected calibration date, to capture a count for data analysis, to download new calibration parameters into the test unit, to remove a data point or to exit back to the configuration screen.

The final screen that can be accessed from the main screen is the SPC screen which allows the user to view X-bar and R charts from ASCII (comma separated value) CSV files generated from the test screen, to load a CSV file for analysis, to examine an SPC analysis of a currently loaded CSV file, or to exit back to the main screen.

Figure 8:
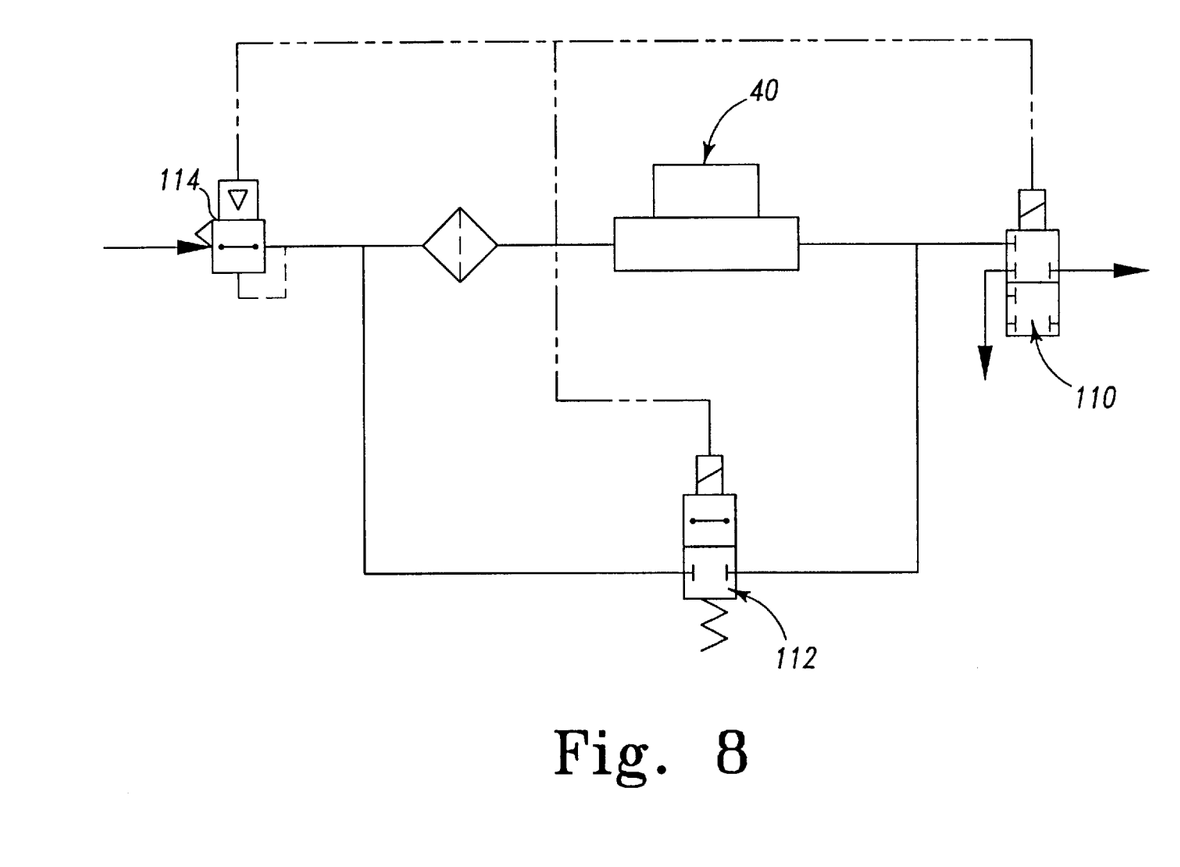
FIG. 8 is a schematic of the IGLS system.

Referring now to FIG. 8, a schematic of the IGLS is shown which illustrates the IGLS system in a typical application. The application is described below in a series of steps. The process can be activated by either the IGLS start button or using a remote start. Once the process is enabled, the IGLS can turn a clamp/seal valve on, to activate the quick/clamp seal. The clamp/seal valve is optional. The IGLS then opens the pressure 110 and quick fill 112 valves to quickly pressurize the test unit. If an automatic pressure controller 114 is installed, the IGLS will control the pressure throughout the test using a digital high speed PID control and the feedback from the pressure sensor. Once pressure is established, the IGLS will turn the quick fill valve 112 off. After a short stabilization period, the measurement starts. Leak flow rate, as well as pressure are measured and compared to pre-set values in the IGLS 40. If the leak flow rate exceeds the pre-set value, or pressure decays out of the specified range, the test fails. The test results are then shown on the IGLS LCD display along with the proper failure message. The pass/fail outputs turn on or off. The pressure can be automatically depleted or maintained for leak point detection. If maintained, an operator simply presses the start button again to deplete the pressure and stop the test. The IGFS/IGLS system can be installed as either a permanent or a portable configuration depending on the application requirements. This invention can be used for precision flow measurement and calibration (IGFS) or leak flow detection (IGLS).

This invention works as a leak detecting unit as it measures the amount of make-up mass flow to the unit under test which is assumed to be at the steady state conditions. Therefore, the amount of the mass flow to the unit under test equals the flow leakage.

Inlet pressure expansion tank 115 is used to reduce pressure fluctuations. There is no need for large tanks, however, an expansion tank 115 between the pressure/vacuums controller 114 and IGLS will reduce pressure fluctuations and significantly increase system performance. A filter 116 is installed on the inlet side of the IGLS/IGFS to avoid excessive contamination, which may cause the distortion of the readings. Pressure valve 110 can be three-way valve connected to the unit under test when energized and connected to atmosphere when it is deenergized. Fill valve 112 is used to bypass the IGFS/IGLS passage, and to quickly fill up the unit under test, to get to steady state condition. Two types of pressure/vacuum controllers 114 can be used; a manual type (with knob adjustments) and an electronic pressure controller. The electronic pressure controller should be compatible with the electrical output signal. For higher flow rates, an electronic pressure controller with a volume booster may be required. All pressure controllers must include a vent to allow pressure reduction. When selecting a pressure controller, the most important criteria are pressure stability and response time. The IGLS can control a fill valve 112, pressure valve 110 as well as an electronic pressure/vacuum controller 114, if available, which is collectively referred to as valve sequence control.

When installation of the system is completed, push the start button on the front panel or the remote input of the IGLS will start the leak test. The software inside of the IGLS will do all valve open/close for the predetermined period of time. At the end of the test, the IGLS will display the test pass/fail result. If "Fail" is detected, the type of failure such as "GrossLeak" (pressure could not be established due to extremely large leak), "FineLeak" (the leakage value is out of the predetermined tolerance), "BackFlow" (the direction of flow is opposite to what is supposed to be) etc. will be displayed on the LCD screen.

Figure 9:
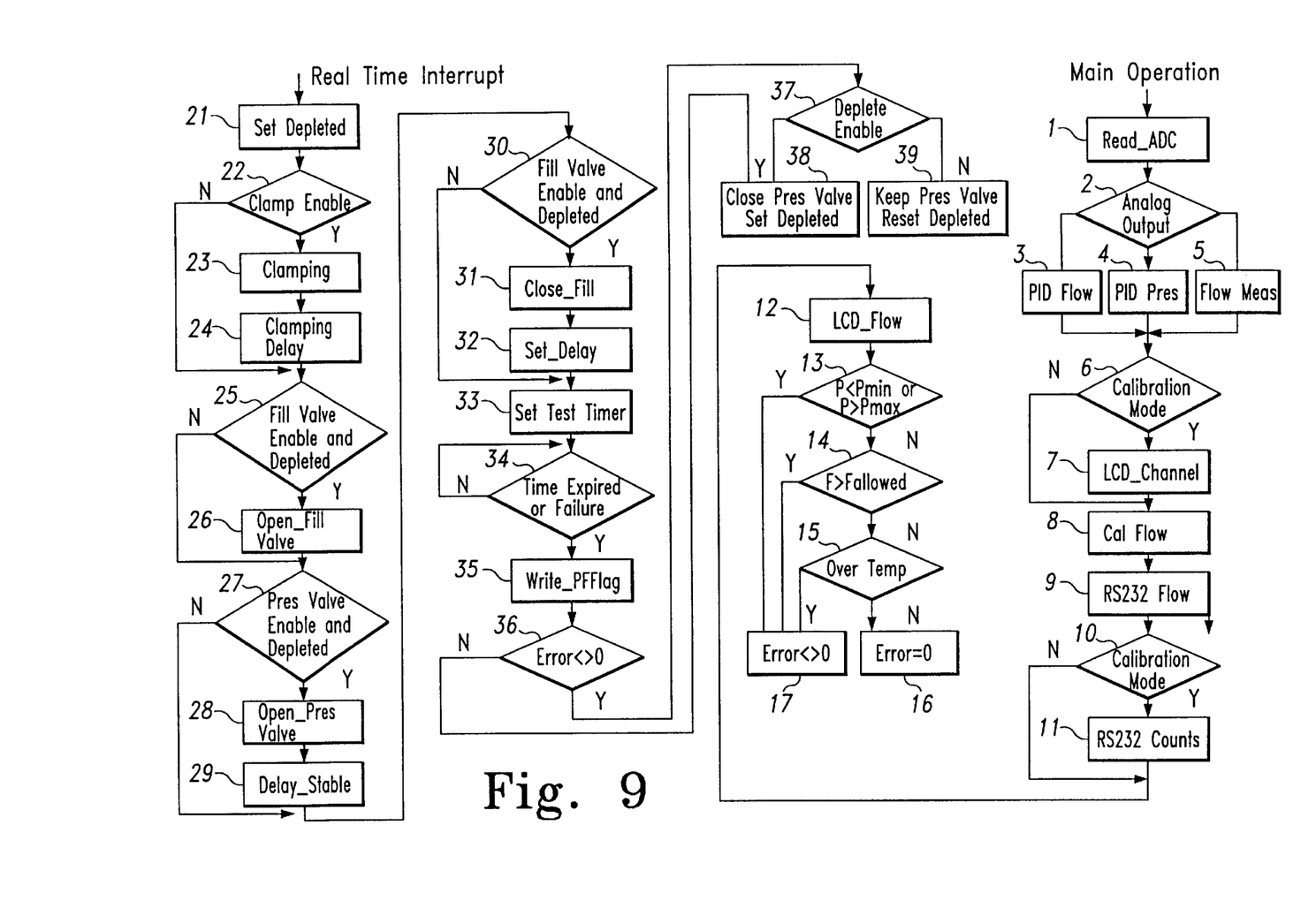
FIG. 9 is a flow chart of the IGLS functions.

Referring now to FIG. 9, a flow chart of the leak test function of the IGLS is shown. The real time interrupts serve as user operation control, valve open/close and accommodate the real time data acquisition as well. When the start button is pushed after the unit is powered, the real time interrupt reset to Block 21. The unit will determine in Block 22 whether the clamp is enabled. If the clamp is enabled, the IGLS will clamp in Block 23 and delay for a period of time determined by Block 24. If the clamp is not enabled in Block 22, the system will go immediately to Block 25. Block 25 will determine if the fill valve control is enabled and the system is depleted. If the answer is yes, Block 26 will be engaged to open the fill valve. If the answer in Block 25 is no, the system will go to Block 27 to determine if the pressure valve is enabled and depleted. If the pressure valve is enabled and the system is depleted, the pressure valve will be opened in block 28 and delay for a certain period of time in Block 29. If the pressure valve is not enabled and the system is not depleted, the system will go immediately to Block 30. The same criteria are checked in Block 30 as in Block 25 to provide stability to the system. However, in Block 30, if the answer to whether the fill valve is enabled and the system depleted is yes, Block 31 will then close the fill valve and Block 32 will delay the closure for stability. If the fill valve is not enabled and the system is not depleted, the system will immediately go to Block 33.

Block 33 sets the time for the test and is the last preparation step prior to performing the test. If the test time has not expired and/or a failure has not occurred in Block 34, the main operation in Blocks 1 through 17 runs. If the test time has expired or a failure has occurred in Block 34, Block 35 will indicate a pass/fail status by sending out a digital I/O signal to an external device. Block 36 will determine the status of the system. If the error is zero, the pressure valve will be closed and the system will be depleted in Block 37. If the error is not zero, the depletion setting in Block 37 will be referenced and depending on the setting either Block 38 or Block 39 will be utilized. If the pressure valve is enabled, Block 38 will be used and the pressure valve will be closed and the system depleted. If the pressure valve is not enabled, the pressure valve will remain open and the deplete setting will be reset.

The main operation of the IGLS is shown in Blocks 1 through 17. The Analog-to-Digital conversion data for differential pressure, static pressure and temperature will be read in Block 1. The analog output will be determined in Block 2 and the analog output will be configured as either flow control in Block 3, pressure control in Block 4, or flow measurement in Block 5.

Block 6 then checks to see if the current configuration is a calibration mode. If the current configuration is a calibration mode, the LCD in Block 7 will display a digital count and number in the appropriate engineering unit for each A/D channel. If the current configuration is not a calibration mode, the operation immediately goes to Block 8.

Block 8 calculated flow with the flexible unit option expressed in either mass flow units or volume flow units. Next, the calculated temperature, static pressure and flow as well as the status of the operation will be disclosed in Block 9. The status of the operation will be expressed as testing, standby, pass or fail.

Block 10 determines whether the current mode is calibration. If the current mode is calibration, the RS232 will record temperature, static pressure and differential pressure digital counts in Block 11. If the current mode is not calibration, the operation will immediately go to Block 12. Block 12 will display the flow and static pressure in an LCD readout.

Block 13 check to determine if the static pressure reading is outside the specification parameters. It can be configured based on the flow pressure sensor's capability or on a specific setting based on a particular need. The flow check is conducted by determining if the flow exceeds a certain setting scope or is beyond the capability of the differential pressure sensor's capability in Block 14. Block 15 conducts a temperature check. In each instance in Blocks 13, 14 or 15, if a setting or limit is exceeded or not reached, the operation goes to Block 17 and an error code will be assigned. If the values in Blocks 13, 14 or 15 are within acceptable parameters, the operation goes to Block 16 and demonstrates that there is no error.

Other modifications may be made without departing from the ambit of the invention, the nature of which, is to be determined from the foregoing description and the appended claim.

What is claimed is:

1. An intelligent gas leak test and gas flow standard apparatus, comprising:
   a) a body having a first end portion and a second end portion and a conical bore therein, said conical bore is larger at said first end portion and smaller at said second end portion, said conical bore providing acceleration/deceleration of said gas flow through said body to establish controlled differential pressure and higher resolution;
   b) a center shaft positioned in said conical bore forming a variable area laminar flow gap bounded by the surface of said conical bore and said center shaft, said laminar flow gap having a width that provides a Reynold number of less than 700;
   c) a precisely machined spacer at said second end portion of said body for linearly positioning said center shaft within said conical bore, said first end portion and said second end portion supporting said center shaft to prevent vertical or rotational movement;
   d) a pressure differential sensor connecting to said laminar flow gap to measure differential pressure at the point in which the laminar flow within said laminar flow gap is the least turbulent to facilitate accuracy and measurement stability;
   e) a temperature sensor for determining the temperature of the gas flowing through said laminar flow gap;
   f) a static pressure sensor for measuring the static pressure in a columnar housing to provide an electrical signal output;
   g) a microcontroller connected to said pressure differential sensor, said temperature means and said static pressure sensor, which microcontroller uses embedded software to calculate gas flow measurements and leak detection; and
   h) an inlet end cap attached to said first end portion of said body and an outlet end cap attached to said second end portion of said body to locate said center bore of said body and said center shaft.

2. The intelligent gas leak test and gas flow standard apparatus of claim 1, wherein said pressure differential sensor comprises a first receiving port, a second receiving port, a columnar housing, a first diaphragm and a second diaphragm whereby gas flows from said laminar flow gap through said first receiving port to said first diaphragm, and at a second position on said laminar flow gap, gas flows from said laminar flow gap through said second receiving port to said columnar housing to said second diaphragm and the relative displacement of said first and said second diaphragms are used to calculate the differential pressure to reduce the likelihood of turbulence of flow between said first receiving port and said second receiving port.

3. The intelligent gas leak test and gas flow standard apparatus of claim 2, wherein said first receiving port is located at a distance of $L/h>50$, where "L" is the distance from edge of the conical portion of said center shaft to the location of said first receiving port and "h" is the height of said laminar flow gap to measure the differential pressure where said flow is fully linear.

4. The intelligent gas leak test and gas flow standard apparatus of claim 3, wherein said second receiving port on said laminar flow gap is located between 2 and 3 inches from said first receiving port to optimize pressure differential, size limitations and measurement resolution.

5. The intelligent gas leak test and gas flow standard apparatus of claim 1 wherein said center shaft has a cylindrical portion with a plurality of inlet holes, a chamfer and a conical portion such that gas flows through said plurality of inlet holes and the gas strikes the chamfer and is directed toward the conical portion where laminar flow is accomplished between said conical portion of said center shaft and said conical bore, said cylindrical portion further containing a keyway to facilitate repeated assembly after maintenance cleaning.

6. The intelligent gas leak test and gas flow standard apparatus of claim 1 wherein a spring washer located between said first end portion of said body and the inlet end of said center shaft and a spacer located between the outlet end of said center shaft and the second end portion of said body, support said center shaft and maintain the position of said center shaft after the assembly and during application when pressure changes occur.

7. The intelligent gas leak test and gas flow standard apparatus of claim 1 wherein a plurality of outlet holes are drilled in said body and a plurality of spacer outlet holes is drilled in said spacer such that the gas flows through said laminar flow gap to said plurality of outlet holes in said body and then through said plurality of spacer outlet holes in said spacer and finally through said end cap, said body containing a pin and said spacer containing a hole to accommodate said pin and facilitate repeated assembly after maintenance cleaning.

8. The intelligent leak test and gas flow measurement apparatus of claim 1 wherein the conical portion of said center shaft is tapered between 1 and 10 degrees to adjust the differential pressure to a desirable amount based on the flow range to be measured.

9. The intelligent leak test and gas flow measurement apparatus of claim 1 wherein said microcontroller stores the gas constant and viscosity of various gases, downloads the said gas constant and viscosity values for the appropriate gas and calculates the flow using the universal calibration curve when a different gas is used.

10. The intelligent leak test and gas flow measurement apparatus of claim 1 wherein for low differential pressure said laminar flow travels from the small pressure area to the large pressure area to facilitate pressure measurement at low pressures and for higher differential pressure the flow travels from the large pressure area to the small pressure area to facilitate higher repeatability of measurements.

11. The intelligent leak test and gas flow measurement apparatus of claim 1 wherein said microcontroller software together with its auxiliary electrical components is capable of performing its measurement and control capabilities with the gas flowing in either direction within said body to measure both the leak test and measurement control function.

12. A method for leak detection, comprising the steps of:
   a) supporting a conical center shaft within a conical bore to form a laminar flow gap;
   b) forcing a gas through said laminar flow gap which flows in a direction from the inlet or larger end of said conical center shaft to the outlet or smaller end of said conical center shaft;
   c) measuring the differential pressure between two points within said laminar flow gap;
   d) measuring the temperature of the gas;
   e) measuring the static pressure of the gas;
   f) using a microcontroller to compute the leakage and determining the pass/fail result;
   g) adjusting the pressure control based on the actual static pressure measurement and establishing steady state conditions for said leak detection error; and
   h) performing valve sequence control.

13. A method for gas flow measurement, comprising the step of:
   a) supporting a conical center shaft within a conical bore to form a laminar flow gap;
   b) forcing a gas through said variable laminar flow gap which flows in a direction from the outlet or smaller end of said conical center shaft to the inlet or larger end of said conical center shaft to achieve a desired pressure differential for a given flow range or a desired flow range for a given pressure differential;
   c) measuring the differential pressure between two points within said laminar flow gap;
   d) measuring the temperature of the gas;
   e) measuring the static pressure of the gas;
   f) using a microcontroller to compute the gas flow measurements, including the volumetric flow and the mass flow and determining the temperature compensation to allow for thermal expansion of said center shaft based on the universal calibration curve; and
   g) using said gas flow measurements to perform flow control.

* * * * *